(12) United States Patent
Bae (10) Patent No.: US 8,761,577 B2
(45) Date of Patent: Jun. 24, 2014

(54) SYSTEM AND METHOD FOR CONTINUOUS PLAYING OF MOVING PICTURE BETWEEN TWO DEVICES

(75) Inventor: Tae Meon Bae, Daegu (KR)

(73) Assignee: SK Planet Co., Ltd. (KR)

( * ) Notice: Subject to any disclaimer, the term of this patent is extended or adjusted under 35 U.S.C. 154(b) by 636 days.

(21) Appl. No.: 12/737,713

(22) PCT Filed: Dec. 10, 2008

(86) PCT No.: PCT/KR2008/007290
§ 371 (c)(1),
(2), (4) Date: Feb. 8, 2011

(87) PCT Pub. No.: WO2010/002080
PCT Pub. Date: Jan. 7, 2010

(65) Prior Publication Data
US 2011/0182561 A1   Jul. 28, 2011

(30) Foreign Application Priority Data

Jun. 30, 2008 (KR) .................. 10-2008-0062463

(51) Int. Cl.
*H04N 9/80* (2006.01)
(52) U.S. Cl.
USPC ........................................................ 386/248
(58) Field of Classification Search
USPC .......... 386/239, 248, 326, 329, 343, 345, 348
See application file for complete search history.

(56) References Cited

U.S. PATENT DOCUMENTS

| | | | |
|---|---|---|---|
| 6,606,636 B1 * | 8/2003 | Okazaki et al. | 1/1 |
| 8,122,477 B1 * | 2/2012 | Stepanian | 725/91 |
| 2002/0034373 A1 * | 3/2002 | Morita et al. | 386/1 |
| 2003/0035479 A1 * | 2/2003 | Kan et al. | 375/240.12 |
| 2007/0248317 A1 * | 10/2007 | Bahn | 386/83 |

FOREIGN PATENT DOCUMENTS

| | | |
|---|---|---|
| CN | 001818900 | 8/2006 |
| CN | 101150484 | 3/2008 |
| KR | 1020060108822 | 10/2006 |
| KR | 100664227 | 12/2006 |
| KR | 1020070086349 | 8/2007 |
| KR | 10-0765368 | 10/2007 |
| KR | 100765368 | 10/2007 |

* cited by examiner

*Primary Examiner* — Tat Chio
(74) *Attorney, Agent, or Firm* — Baker Hostetler LLP (57) ABSTRACT

The present invention relates to a system and method for playing an identical moving picture on different types of devices, in which one terminal registers both a moving picture played thereon and the play information thereof in a server, and another terminal can download the moving picture and the play information from the server and continuously play the moving picture from a scene at which the playing thereof had previously been terminated. A server according to the present invention includes a communication unit (410) for communicating with a user terminal. A picture management unit (420) receives a moving picture and play information thereof from the user terminal, and provides the moving picture and the play information to a terminal which is of a type different from that of the user terminal. A picture information database (430) stores the moving picture and the play information.

14 Claims, 4 Drawing Sheets

SYSTEM AND METHOD FOR CONTINUOUS PLAYING OF MOVING PICTURE BETWEEN TWO DEVICES

TECHNICAL FIELD

The present invention relates, in general, to a system and method for playing an identical moving picture on different types of devices. More particularly, the present invention relates to a system and method for playing an identical moving picture on different types of devices, in which one terminal registers both a moving picture played thereon and the play information thereof in a server, and another terminal can download the moving picture and the play information from the server and continuously play the moving picture from a scene at which the playing thereof had previously been terminated.

BACKGROUND ART

Recently, technology for allowing the same moving picture to be viewed using a High-Definition TV (HDTV) at home through ubiquitous communication and to be viewed outdoors using a mobile phone, a Personal Multimedia Player (PMP), etc. has been developed. At this time, "place-shift" technology for allowing a moving picture viewed at home to be continuously viewed from a location at which viewing had previously been terminated is important.
The term "place-shift" technology means a technology for allowing a moving picture, viewed using one device at one place, to be viewed using another device in a different place. During a place shift operation, in order to continuously view the originally played moving picture, a function of storing the current location of the played moving picture and starting to play the moving picture from that location using another device is essentially required.

For example, when a moving picture played on a Personal Computer (PC) is intended to be played outdoors using a mobile phone or a PMP, seamless play is possible only when the moving picture starts to be played at the time point at which the playing of the moving picture had been terminated on the PC, on the basis of information about the running time of the moving picture in the PMP or the mobile phone. In this case, this requirement is valid only when a moving picture played on the PC and a moving picture played on the PMP or the mobile phone are identical to each other, and moving picture compression is performed by changing only the size of the moving picture or varying compression conditions with respect to the same moving picture source. When a moving picture, which is identical to a moving picture played on the PC and a specific section of which has been deleted or edited on the PC, is intended to be viewed on the PMP or the mobile phone, there is a problem in that, since the play location of the moving picture was changed by the deletion or editing, it becomes impossible to continuously view the moving picture from the time point at which the playing of the moving picture had previously been terminated.

DISCLOSURE

Technical Problem

Accordingly, the present invention has been made keeping in mind the above problems occurring in the prior art, and an object of the present invention is to provide a system and method for playing an identical moving picture on different types of devices, in which one terminal registers both a moving picture played thereon and the play information thereof in a server, and another terminal can download the moving picture and the play information from the server and continuously play the moving picture from the scene at which the playing of the moving picture had been previously terminated.

Technical Solution

In order to accomplish the above object, the present invention provides a management server for playing an identical moving picture, comprising a communication unit for communicating with a user terminal; a picture management unit for receiving a moving picture and play information thereof from the user terminal, and providing the moving picture and the play information to a terminal which is of a type different from that of the user terminal; and a picture information database for storing the moving picture and the play information.

In this case, the play information includes a title and a total running time of a most recently played moving picture, a time stamp corresponding to a most recently played location of the moving picture, and a color histogram of the moving picture at the most recently played location.

Further, the color histogram includes color information statistics defined in a color histogram descriptor of Moving Picture Experts Group (MPEG)-7.

Further, in order to accomplish the above object, the present invention provides a user terminal, comprising a communication unit for communicating with a server which manages a moving picture and play information thereof; a moving picture storage unit for storing the moving picture; a moving picture play unit for playing the moving picture; a moving picture management unit for registering the play information of the played moving picture in the server, or for downloading the moving picture and the play information from the server and managing the moving picture and the play information; and a control unit for performing control such that the moving picture is continuously played from a location at which playing thereof had previously been terminated, on a basis of the play information.

Further, the user terminal may further comprise a moving picture editing unit for editing the moving picture; and an output unit for outputting the moving picture through a screen.

Further, in a case where the moving picture is intended to be played, the control unit performs control such that, when it searches the play information for metadata having a title identical to that of a moving picture intended to be currently played, and metadata having the identical title is present, the control unit compares a total running time recorded in the metadata with a total running time of the current moving picture, and plays the moving picture from a location of a time stamp recorded in the metadata when the total running times are identical to each other.

Further, the control unit performs control such that it searches for an intra-frame (I) which is closest to a location of the time stamp and is smaller than the time stamp of the metadata, extracts a color histogram from a found intra-frame (I), compares the extracted color histogram with a color histogram of the metadata, and plays the moving picture from the intra-frame (I) when a difference between the color histograms is equal to or less than a predetermined level.

Further, the control unit performs control such that, when the color histogram of the intra-frame (I) is compared with the color histogram of the metadata, and the difference between the extracted color histogram and the color histogram of the metadata is greater than the predetermined level, the control unit extracts color histograms from N frames temporally subsequent to and N frames temporally previous to the intra-frame (I), compares the extracted color histograms with the color histogram of the metadata, and plays the moving picture from a location having a minimum difference therebetween.

Further, the control unit performs control such that, when the total running times are different from each other, the control unit extracts color histograms from M frames temporally subsequent to and M frames temporally previous to a location corresponding to the time stamp/total running time, compares the extracted color histograms with the color histogram of the metadata, and plays the moving picture from a location having a minimum difference therebetween.

Meanwhile, in order to accomplish the above object, the present invention provides a method of continuously playing an identical moving picture on different types of devices, comprising the steps of (a) playing moving pictures and (b) registering in a management server play information, including a title and a total running time of a most recently played moving picture among the played moving pictures, a time stamp corresponding to a most recently played location of the moving picture, and a color histogram of the moving picture at the most recently played location.

Further, the color histogram includes color information statistics defined in a color histogram descriptor of Moving Picture Experts Group (MPEG)-7.

In addition, in order to accomplish the above object, the present invention provides a method of continuously playing an identical moving picture on different types of devices, comprising the steps of (a) downloading a moving picture and play information thereof from a management server; and (b) continuously playing the moving picture from a location, at which playing thereof had previously been terminated, on a basis of the play information.

In this case, the play information includes a title and a total running time of a most recently played moving picture, a time stamp corresponding to a most recently played location of the moving picture, and a color histogram of the moving picture at the most recently played location.

Further, the color histogram includes color information statistics defined in a color histogram descriptor of Moving Picture Experts Group (MPEG)-7.

Further, step (b) is performed to search the play information for metadata having a title identical to that of a moving picture intended to be currently played, compare a total running time recorded in the metadata with a total running time of the current moving picture when metadata having the identical title is present, and play the moving picture from a location of the time stamp recorded in the metadata when the total running times are identical to each other.

Further, step (b) is performed to search for an intra-frame (I) which is closest to a location of the time stamp and is smaller than the time stamp of the metadata, extract a color histogram from a found intra-frame (I), compare the extracted color histogram with a color histogram of the metadata, and play the moving picture from the intra-frame (I) when a difference between the color histograms is equal to or less than a predetermined level.

Further, step (b) is performed such that, when the color histogram is extracted and is compared with the color histogram of the metadata and a difference between the color histograms is greater than the predetermined level, color histograms are extracted from N frames temporally subsequent to and N frames temporally previous to the intra-frame (I) and are compared with the color histogram of the metadata, and the moving picture is played from a location having a minimum difference therebetween.

Further, step(b) is performed such that, when the total running times are different from each other, color histograms are extracted from M frames temporally subsequent to and M frames temporally previous to a location corresponding to the time stamp/total running time and are compared with the color histogram of the metadata, and the moving picture is played from a location having a minimum difference therebetween.

Advantageous Effects

According to the present invention, a user may transmit a specific moving picture that was played on a PC terminal to another terminal, such as a Personal Digital Assistant (PDA) or a PMP, which is of a type different from that of the PC terminal, and may continuously view in a different place the moving picture from the scene at which the playing of the moving picture had been terminated during the viewing of the moving picture. Further, the user may edit a moving picture that was played on a PC terminal and may continuously view the edited moving picture using a different type of terminal.

DESCRIPTION OF REFERENCE CHARACTERS
OF IMPORTANT PARTS

<Description of reference characters of important parts>

| | | | |
|---|---|---|---|
| 100: | identical moving picture play system | | |
| 110 ~ 114: | user terminal | | |
| 120: | communication network | 130: | management server |
| 132: | management DB | 302: | communication unit |
| 304: | moving picture storage unit | 306: | moving picture play unit |
| 308: | moving picture management unit | 310: | control unit |
| 312: | moving picture editing unit | 314: | input unit |
| 315: | output unit | 410: | communication unit |
| 420: | picture management unit | 430: | picture information DB |
| 440: | control unit | | |

[Mode for Invention]

The above and other objects, technical constructions and advantages of the present invention will be more clearly understood from the following detailed description taken in conjunction with the accompanying drawings. Hereinafter, embodiments of the present invention will be described in detail with reference to the attached drawings.

Figure 1:
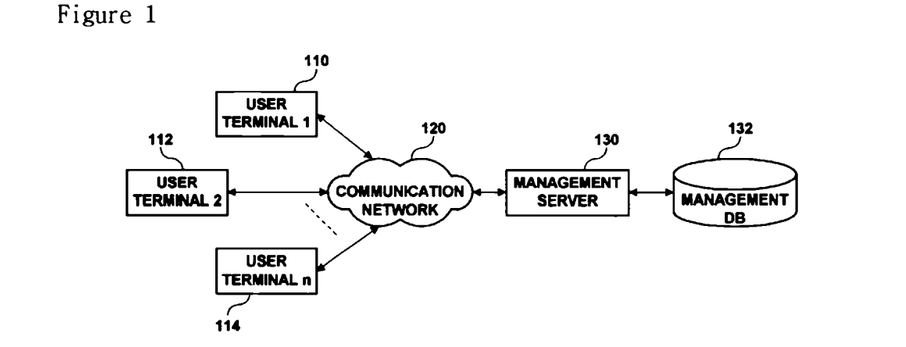
FIG. 1 is a diagram schematically showing the construction of a system for playing an identical moving picture on different types of devices according to an embodiment of the present invention

FIG. 1 is a diagram schematically showing the construction of a system for playing an identical moving picture on different types of devices.

Referring to FIG. 1, an identical moving picture play system 100 to which the present invention is applied includes user terminals 110 to 114, a communication network 120, a management server 130, and a management Database (DB) 132.

The first user terminal 110 is a terminal for playing a moving picture and outputting the play information of the played moving picture.

The communication network 120 includes a wired communication network, such as the Internet, and a wireless communication network, such as a mobile communication network.

The management server 130 receives registration of the moving picture and the play information from the first user terminal 110, and provides the moving picture and play information to the first user terminal 110 and the second user terminals 112 and 114 which are of types different from that of the first user terminal.

Each of the second user terminals 112 and 114 downloads the moving picture and play information from the management server 130, and plays the moving from a scene at which the playing thereof had previously been terminated, or edits and plays the downloaded moving picture.

Figure 2:
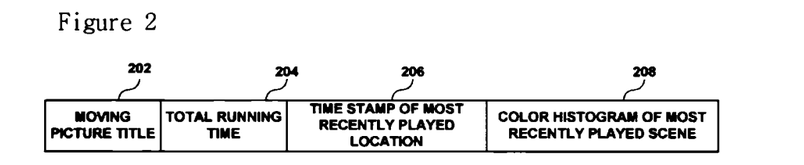
FIG. 2 is a diagram showing the configuration of the play information format of a moving picture played on a user terminal according to the present invention

Here, the play information of the moving picture includes the title 202 of the most recently played moving picture, the total running time 204 of the moving picture, a time stamp 206 corresponding to the most recently played location of the moving picture, and a color histogram 208 of the moving picture at the most recently played location, as shown in FIG. 2. FIG. 2 is a diagram showing the configuration of the play information format of a moving picture played on a user terminal according to the present invention.

Further, the color histogram includes color information statistics defined in the color histogram descriptor of Moving Picture Experts Group (MPEG)-7. In this case, the moving picture title 202 may be replaced with the unique ID of moving picture content, by which it can be verified that the edited work and the original work of the moving picture have the same content.

In this case, when the first user terminal 110 is, for example, a PC, the second user terminals 112 and 114 may be mobile communication terminals, PMPs, etc.

Each of the second user terminals 112 and 114 searches play information for metadata having a title identical to that of a moving picture intended to be currently played, and compares a total running time recorded in metadata with the total running time of the current moving picture when the meta data having the identical title is present. When the total running times are identical to each other, each user terminal 112 or 114 plays the moving picture from a location corresponding to the location of the time stamp recorded in the metadata.

That is, each of the second user terminals 112 and 114 searches for an intra-frame (I) which is closest to the location of the time stamp and is smaller than the time stamp of the metadata, extracts a color histogram from the found intra-frame (I), compares the extracted color histogram with the color histogram of the metadata, and plays the moving picture from the intra-frame (I) when the difference between the color histograms is equal to or less than a predetermined level.

Further, when each of the second user terminals 112 and 114 extracts the color histogram and compares the extracted color histogram with the color histogram of the metadata, and the difference therebetween is greater than the predetermined level as a result of the comparison, each second user terminal 112 or 114 extracts color histograms from N frames temporally subsequent to the intra-frame (I) and N frames temporally previous to the intra-frame (I), compares the extracted color histograms with the color histogram of the metadata, and plays the moving picture from a location having a minimum difference therebetween.

Further, when the total running times of the metadata and the current moving picture are different from each other, each of the second user terminals 112 and 114 extracts color histograms from M frames temporally subsequent to and M frames temporally previous to a location corresponding to the time stamp/total running time, compares the extracted color histograms with the color histogram of the metadata, and plays the moving picture from a location having a minimum difference therebetween.

Further, when the title of a moving picture recorded in the metadata is different from the title of the current moving picture, each of the second user terminals 112 and 114 outputs a warning message, indicating that the relevant moving picture cannot be continuously played because the moving pictures are different from each other.

The user terminals 110 to 114 may be terminal devices, such as PCs, mobile communication terminals or Personal Digital Assistants (PDAs) capable of playing multimedia data regardless of wired communication or wireless communication.

Figure 3:
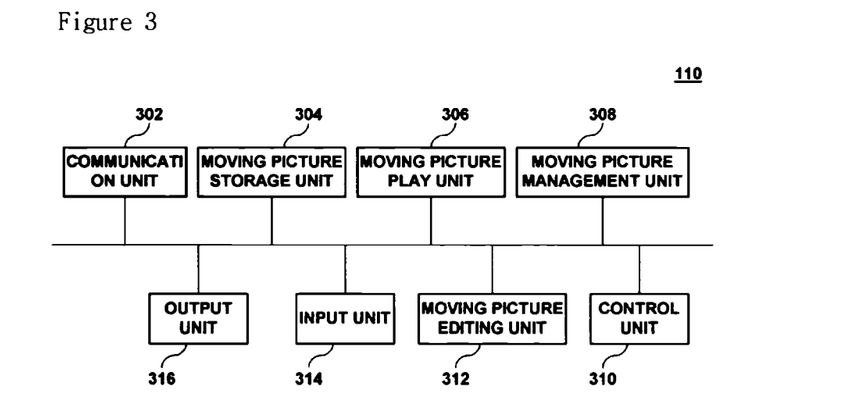
FIG. 3 is a diagram schematically showing the construction of a user terminal according to an embodiment of the present invention

FIG. 3 is a diagram schematically showing the construction of a user terminal according to an embodiment of the present invention.

Referring to FIG. 3, each of the user terminals 110 to 114 according to the present invention includes a communication unit 302, a moving picture storage unit 304, a moving picture play unit 306, a moving picture management unit 308, a control unit 310, a moving picture editing unit 312, an input unit 314, and an output unit 316.

The communication unit 302 communicates with the management server 130 which manages a moving picture and play information thereof.

The moving picture storage unit 304 stores moving pictures received from an external device or moving pictures received through a communication network.

The moving picture play unit 306 plays a moving picture loaded from the moving picture storage unit 304.

The moving picture management unit 308 registers the play information of a moving picture, played by the moving picture play unit 306, in the management server 130, or downloads a moving picture and play information thereof from the management server 130 and manages the downloaded moving picture and play information.

The control unit 310 performs control such that the moving picture is continuously played from a location at which the playing thereof had previously been terminated on the basis of the play information at the time of playing the moving picture.

The moving picture editing unit 312 edits a moving picture in compliance with the user 될 editing command received from the input unit 314. At this time, editing operations performed by the moving picture editing unit 312 may include an operation of deleting an unnecessary scene from moving pictured at a or adding a new scene to the moving picture data, an operation of applying moving picture processing effects, etc. Further, the moving picture editing unit 312 includes a moving picture encoding unit for encoding edited moving picture.

The input unit 314 receives the moving picture editing command from the user. Further, the input unit 314 includes a plurality of buttons, such as buttons for characters, numerals and symbols, required to input operating commands for the device.

The output unit 316 outputs the moving picture to the screen in the form of audio and video.

Further, although not shown in the drawings, each of the user terminals 110 to 114 includes a storage unit for storing encoded moving picture data or other types of data.

Further, in the case where a moving picture stored in the moving picture storage unit 304 is intended to be played by the moving picture play unit 306, the control unit 310 performs control such that it searches play information for metadata, having a title identical to that of a moving picture intended to be currently played, through the moving picture management unit 308, and such that, when the meta data having the identical title is present, the control unit 310 compares the total running time recorded in the metadata with the total running time of the current moving picture, and plays the moving picture from the location of the time stamp recorded in the metadata when the total running times are identical to each other.

Further, the control unit 310 performs control such that it searches for an intra-frame (I), which is closest to the location of the time stamp and is smaller than the time stamp of the metadata, through the moving picture management unit 308, extracts a color histogram from the found intra-frame (I), compares the extracted color histogram with the color histogram of the metadata, and plays the moving picture from the intra-frame (I) when the difference therebetween is equal to or less than a predetermined level.

Further, when the control unit 310 extracts the color histogram through the moving picture management unit 308 and compares the extracted color histogram with the color histogram of the metadata, and the difference therebetween is greater than the predetermined level as a result of the comparison, the control unit 310 performs control such that it extracts color histograms from N frames temporally subsequent to the intra-frame (I) and N frames temporally previous to the intra-frame (I), compares the extracted color histograms with the color histogram of the metadata, and plays the moving picture from a location having a minimum difference therebetween.

Further, when the total running times are different from each other, the control unit 310 performs control such that it extracts color histograms from M frames temporally subsequent to and M frames temporally previous to a location corresponding to the time stamp/total running time, compares the color histograms with the color histogram of the metadata, and plays the moving picture from a location having a minimum difference therebetween.

In addition, in the case where a moving picture is intended to be played through the moving picture play unit 306, when the control unit 310 searches the play information for metadata having a title identical to that of a moving picture intended to be currently played through the moving picture management unit 308, and metadata having the identical title is not present, the control unit 310 outputs a warning message, indicating that the moving picture cannot be continuously played because the moving pictures are not identical to each other, to the output unit 316.

Figure 4:
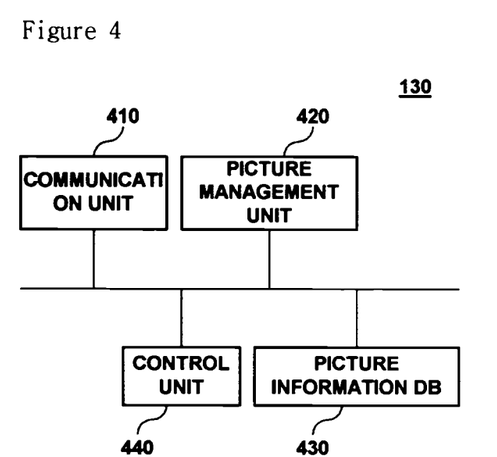
FIG. 4 is a diagram schematically showing the construction of a management server according to an embodiment of the present invention

FIG. 4 is a diagram schematically showing the construction of the management server according to an embodiment of the present invention.

Referring to FIG. 4, the management server 130 according to the present invention includes a communication unit 410, a picture management unit 420, a picture information DB 430, and a control unit 440.

The communication unit 410 communicates with the user terminals 110 to 114 which play or edit moving pictures.

The picture management unit 420 receives registration of a moving picture and play information thereof from the user terminal 110, and provides the moving picture and the play information to the user terminals 112 and 114 which are of types different from that of the user terminal 110.

The picture information DB 430 stores moving pictures and the play information thereof.

The control unit 440 controls both a procedure for receiving registration of a moving picture and the play information thereof from the user terminal 110 and a procedure for providing the moving picture and the play information to the user terminals 112 and 114 which are of types different from that of the user terminal 110.

Here, the play information includes the title of the most recently played moving picture, the total running time of the moving picture, a time stamp corresponding to the most recently played location of the moving picture, and the color histogram of the moving picture at the most recently played location. In this case, the color histogram includes color information statistics defined in the color histogram descriptor of MPEG-7.

Figure 5:
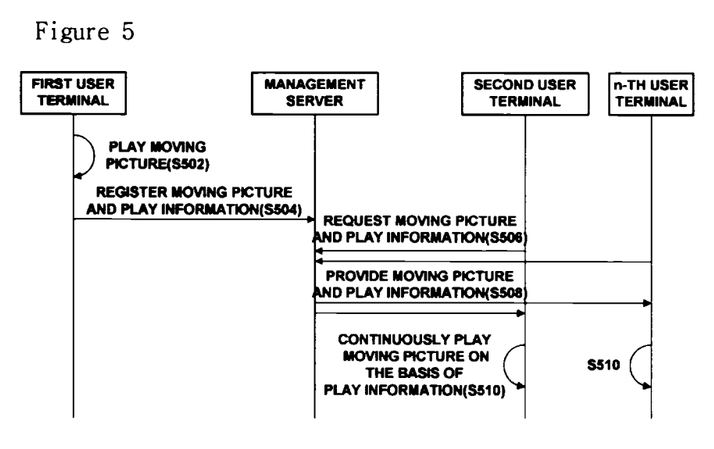
FIG. 5 is a flowchart showing a method of playing an identical moving picture on different types of devices according to an embodiment of the present invention and FIGS. 6a and 6b are flowcharts showing a process for playing a moving picture on different types of user terminals according to the present invention.

FIG. 5 is a flowchart showing a method of playing an identical moving picture on different types of devices according to an embodiment of the present invention.

Referring to FIG. 5, the first user terminal 110 loads a moving picture selected by a user from respective moving pictures stored in the moving picture storage unit 304, and plays the selected moving picture using the moving picture play unit 306 at step S502.

That is, the user can select a moving picture desired to be viewed through his or her PC as the first user terminal 110, and can view the moving picture.

Accordingly, after the first user terminal 110 accesses the management server 130, the moving picture management unit 308 of the first user terminal 110 registers the play information of the moving picture played through the moving picture play unit 306 in the management server 130 at step S504.

Here, as shown in FIG. 2, the play information includes the title of the most recently played moving picture, the total running time of the moving picture, a time stamp corresponding to the most recently played location of the moving picture, and the color histogram of the moving picture at the most recently played location. The color histogram includes color information statistics defined in the color histogram descriptor of MPEG-7. In this case, the title of the moving picture may be replaced with the unique ID of moving picture content, by which it can be verified that the edited work and original work of the moving picture have the same content.

The management server 130 stores the moving picture and the play information received from the first user terminal 110 in the management DB 132.

Meanwhile, the user can move to another place while viewing the moving picture on his or her PC. At this time, the user can continuously view the moving picture using the second user terminal 112 or the n-th user terminal 114, such as a mobile communication terminal, a PMP or a PDA.

The second user terminal 112 or the n-th user terminal 114 accesses the management server 130 and requests a moving picture and play information from the management server 130 in compliance with the user 필 manipulation command at step S506.

Accordingly, the management server 130 reads the moving picture and play information from the management DB 132 and provides the read information to the second user terminal 112 or the n-th user terminal 114 at step S508.

The second user terminal 112 or the n-th user terminal 114 downloads the moving picture and the play information from the management server 130.

Then, the second user terminal 112 or the n-th user terminal 114 continuously plays the moving picture from the location at which the playing thereof had been terminated by the first user terminal 110 on the basis of the play information at step S510.

In this case, the second user terminal 112 or the n-th user terminal 114 may edit the downloaded moving picture through the moving picture editing unit 312 and store the edited moving picture in the moving picture storage unit 304.

That is, the user selects a moving picture editing menu and selects moving picture data desired to be edited through the input unit 314. The user inputs a command for editing moving picture data through the input unit 314, and the control unit 310 receives the moving picture data editing command from the input unit 314. Accordingly, the control unit 310 reads the moving picture data, which is the editing target selected by the user, and loads the data onto a buffer. The control unit 310 displays the loaded moving picture data on the output unit 316 in the form of respective frame images.

The moving picture data is, for example, Moving Picture Experts Group (MPEG)-based moving picture, in which I pictures, P pictures and B pictures, which have different sizes and are different types of pictures, are implemented in the form of Group Of Pictures (GOPs). An I picture can be played independently without referring to other pictures and requires a largest number of bits. A P picture contains difference information from an I picture or another P picture when unidirectionally referring to the I picture or the P picture, and requires a smaller number of bits than the I picture. A B picture contains difference information from I or P pictures when bidirectionally referring to the I or P pictures, and requires a smallest number of bits.

The user designates an editing section corresponding to, for example, a second GOP, by manipulating the input unit 314, and the control unit 310 displays the moving picture data of the second GOP corresponding to the editing section on the screen of the output unit 316.

Then, the user executes an editing operation of deleting an unnecessary moving picture from the editing section of the moving picture data through the input unit 314. The control unit 310 performs editing by deleting, for example, a second B picture and a fourth B picture, from the second GOP corresponding to the editing section through the moving picture editing unit 312. The moving picture editing unit 312 encodes a first GOP, a third GOP and ann-th GOP, other than the second GOP which is the moving picture editing target, through a moving picture encoding unit (not shown).

The control unit 310 may play the moving picture edited through the above procedure using the moving picture play unit 306.

Figure 6A:
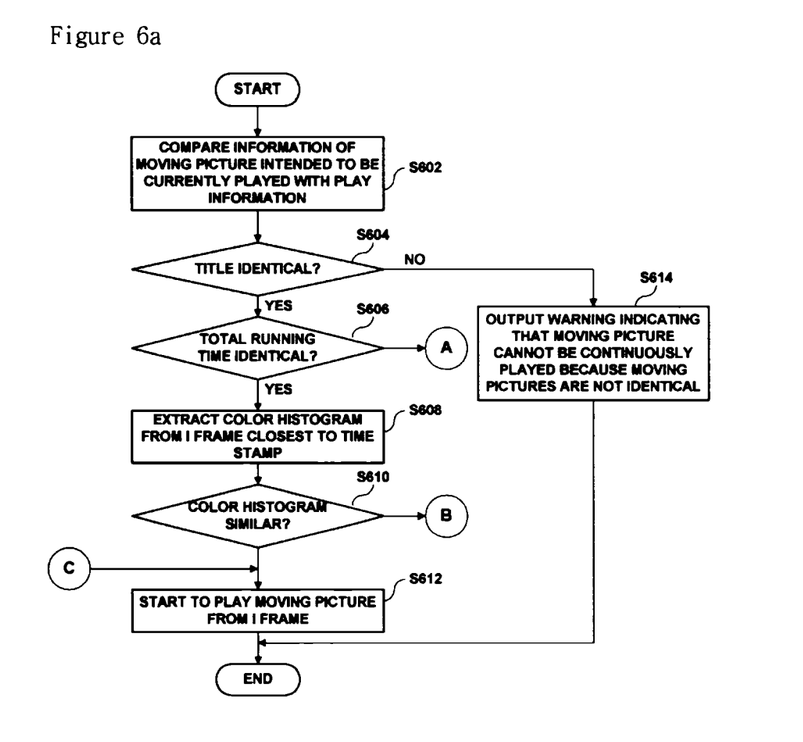
Figure 6B:
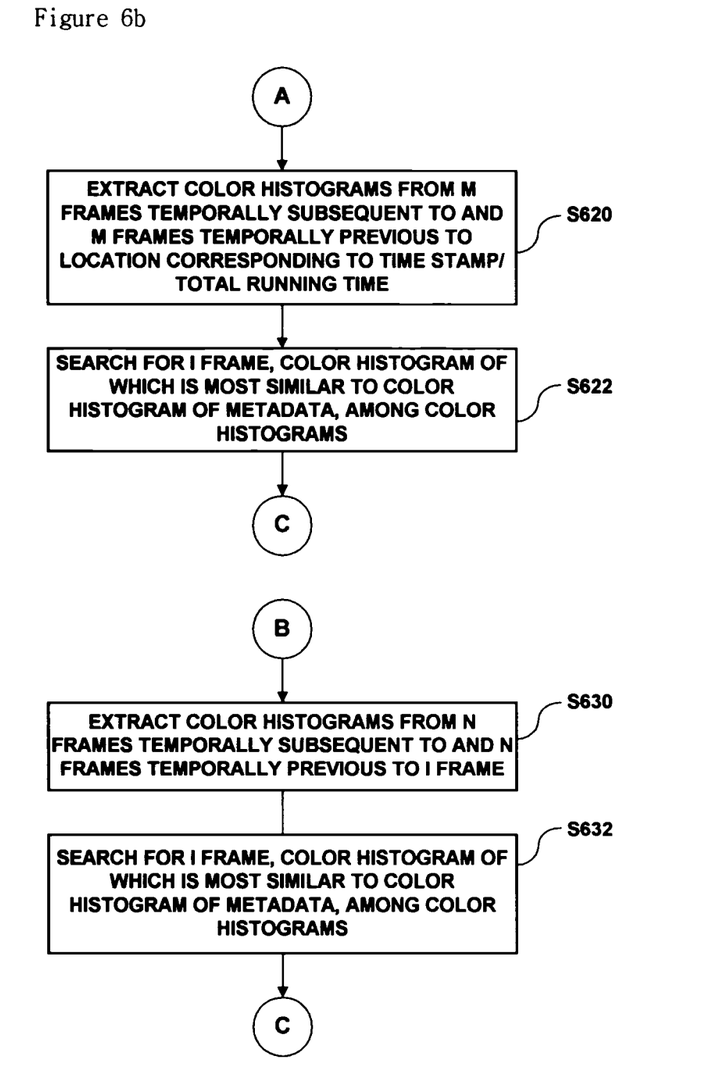

FIGS. 6a and 6b are flowcharts showing a process for playing a moving picture on different types of user terminals according to the present invention.

Referring to FIGS. 6a and 6b, the second user terminal 112 or the n-th user terminal 114 plays a moving picture downloaded from the management server 130 on the basis of the play information through the following process at the time of playing the downloaded moving picture.

First, the second user terminal 112 or the n-th user terminal 114 compares information of the moving picture to be played with play information at step S602.

The second user terminal 112 or the n-th user terminal 114 searches the play information of the moving picture to be played for metadata having a title identical to that of the moving picture intended to be currently played. When there is metadata having the identical title at step S604 (in the case of YES), the second user terminal 112 or the n-th user terminal 114 determines whether the total running time recorded in the metadata is identical to the total running time of the current moving picture through the comparison therebetween at step S606.

If it is determined at step S606 (in the case of YES) that the total running times are identical to each other, the second user terminal 112 or the n-th user terminal 114 searches for an intra-frame (I), which is closest to the location of a time stamp and is smaller than the time stamp of the metadata, and extracts a color histogram from the found intra-frame (I) at step S608.

When the second user terminal 112 or the n-th user terminal 114 compares the extracted color histogram with the color histogram of the metadata, and the color histograms are similar to each other to such an extent that the difference between the color histograms is equal to or less than a predetermined level at step S610, the moving picture is played from the intra-frame (I) through the moving picture play unit 306 at step S612.

Meanwhile, when the second user terminal 112 or the n-th user terminal 114 searches the play information for metadata having a title identical to that of the moving picture intended to be currently played, and there is no metadata having the identical title at step S604 (in the case of NO), the second user terminal 112 or the n-th user terminal 114 outputs a warning message, indicating that the moving picture cannot be played because the moving pictures are not identical to each other, to the output unit 316 at step S614.

Therefore, the user may recognize that the moving picture intended to be currently played cannot be played by the second user terminal 112 or the n-th user terminal 114.

Further, when the total running times are different from each other even though the titles of the moving pictures are identical to each other at step S606 (in the case of NO), the second user terminal 112 or the n-th user terminal 114 extracts color histograms from M frames temporally subsequent to and M frames temporally previous to a location corresponding to the time stamp/total running time at step S620.

Further, the second user terminal 112 or the n-th user terminal 114 compares the extracted color histograms with the color histogram of the metadata, and then searches for an intra-frame (I), the color histogram of which is most similar to the color histogram of the metadata at step S622.

Further, when the difference between the color histograms is greater than the predetermined level at the time of comparing the extracted color histograms with the color histogram of the metadata at step S610 (in the case of NO), the second user terminal 112 or the n-th user terminal 114 extracts color histograms from N frames temporally subsequent to and N frames temporally previous to the intra-frame (I) at step S630.

Further, the second user terminal 112 or the n-th user terminal 114 compares the extracted color histograms with the color histogram of the metadata, and thus searches for an intra-frame (I), the color histogram of which is most similar to that of the metadata, at step S632.

Thereafter, the second user terminal 112 or the n-th user terminal 114 plays the moving picture from the found intra-frame (I).

Meanwhile, the present invention may record a program for processing the method of playing an identical moving picture on different types of user terminals in a computer-readable recording medium. In this case, the program processes a procedure (a) for downloading a moving picture and play information thereof from the management server and a procedure (b) for continuously playing the moving picture from a location, at which the playing thereof had previously been terminated, on the basis of the play information.

As described above, the present invention can implement a system and method for playing an identical moving picture on different types of devices, in which one terminal registers both a moving picture played thereon and play information thereof in a server, and another terminal can download the moving picture and the play information from the server and continuously play the moving picture from a scene at which the playing thereof had previously been terminated.

Those skilled in the art will appreciate that the present invention can be implemented in various forms without changing the technical spirit or essential features of the present invention, so that the above-described embodiments are only exemplary and should not be interpreted as limiting the scope of the present invention.

Industrial Applicability

The present invention can be applied to communication terminals such as PDAs or mobile communication terminals for displaying moving pictures.

Further, the present invention can be applied to terminal devices such as PCs, PMPs, or notebook computers, which download and store moving pictures, perform an editing process for allowing a user to delete unnecessary scenes or add desired scenes, encode the edited moving pictures, and store the encoded moving pictures again.

In addition, the present invention can be applied to a system for playing an identical moving picture, in which one type of moving picture play terminal can continuously play a desired moving picture while another type of terminal plays the desired moving picture.

The invention claimed is:

1. A user terminal, comprising:
   a communication unit for communicating with a server which manages a moving picture and play information thereof;
   a moving picture storage unit for storing the moving picture;
   a moving picture play unit for playing the moving picture;
   a moving picture management unit for registering the play information of the played moving picture in the server, or for downloading the moving picture and the play information from the server and managing the moving picture and the play information;
   a control unit for performing control such that the moving picture is continuously played from a location at which playing thereof had previously been terminated, on a basis of the play information,
   wherein the control unit, in a case where the moving picture is intended to be played, performs control such that, when it searches the play information for metadata having a title identical to that of a moving picture intended to be currently played, and metadata having the identical title is present, the control unit compares a total running time recorded in the metadata with a total running time of the current moving picture, and plays the moving picture from a location of a time stamp recorded in the metadata when the total running times are identical to each other, and
   wherein the control unit performs control such that it searches for an intra-frame (I) which is closest to a location of the time stamp and is smaller than the time stamp of the metadata, extracts a color histogram from a found intra-frame (I), compares the extracted color histogram with a color histogram of the metadata, and plays the moving picture from the intra-frame (I) when a difference between the color histograms is equal to or less than a predetermined level.

2. The user terminal according to claim 1, further comprising:
   a moving picture editing unit for editing the moving picture; and
   an output unit for outputting the moving picture through a screen.

3. The user terminal according to claim 1, wherein the control unit performs control such that, when the color histogram of the intra-frame (I) is compared with the color histogram of the metadata, and the difference between the extracted color is greater than the predetermined level, the control unit extracts color histograms from N frames temporally subsequent to and N frames temporally previous to the intra-frame (I), compares the extracted color histograms with the color histogram of the metadata, and plays the moving picture from a location having a minimum difference therebetween.

4. The user terminal according to claim 1, wherein the control unit performs control such that, when the total running times are different from each other, the control unit extracts color histograms from M frames temporally subsequent to and M frames temporally previous to a location corresponding to the time stamp/total running time, compares the extracted color histograms with the color histogram of the metadata, and plays the moving picture from a location having a minimum difference therebetween.

5. A method of continuously playing an identical moving picture on different types of devices, comprising the steps of:
   (a) downloading a moving picture and play information thereof from a management server;
   (b) continuously playing the moving picture from a location, at which playing thereof had previously been terminated, on a basis of the play information,
   wherein step (b) is performed to search the play information for metadata having a title identical to that of a moving picture intended to be currently played, compare a total running time recorded in the metadata with a total running time of the current moving picture when metadata having the identical title is present, and play the moving picture from a location of the time stamp recorded in the metadata when the total running times are identical to each other, and
   wherein step (b) is performed to search for an intra-frame (I) which is closest to a location of the time stamp and is smaller than the time stamp of the metadata, extract a color histogram from a found intra-frame (I), compare the extracted color histogram with a color histogram of the metadata, and play the moving picture from the intra-frame (I) when a difference between the color histograms is equal to or less than a predetermined level.

6. The method according to claim 5, wherein the play information includes a title and a total running time of a most recently played moving picture, a time stamp corresponding to a most recently played location of the moving picture, and a color histogram of the moving picture at the most recently played location.

7. The method according to claim 5, wherein the color histogram includes color information statistics defined in a color histogram descriptor of Moving Picture Experts Group (MPEG)-7.

8. The method according to claim 5, wherein step (b) is performed such that, when the color histogram is extracted and is compared with the color histogram of the metadata and a difference between the color histograms is greater than the predetermined level, color histograms are extracted from N frames temporally subsequent to and N frames temporally previous to the intra-frame (I) and are compared with the color histogram of the metadata, and the moving picture is played from a location having a minimum difference therebetween.

9. The method according to claim 5, wherein step (b) is performed such that, when the total running times are different from each other, color histograms are extracted from M frames temporally subsequent to and M frames temporally previous to a location corresponding to the time stamp/total running time and are compared with the color histogram of the metadata, and the moving picture is played from a location having a minimum difference therebetween.

10. A non-transitory computer-readable recording medium for storing a program for processing the method according to claim 5.

11. A non-transitory computer-readable recording medium for storing a program for processing the method according to claim 6.

12. A non-transitory computer-readable recording medium for storing a program for processing the method according to claim 7.

13. A non-transitory computer-readable recording medium for storing a program for processing the method according to claim 8.

14. A non-transitory computer-readable recording medium for storing a program for processing the method according to claim 9.

* * * * *